United States Patent
Schlipf et al.

(10) Patent No.: US 8,939,411 B2
(45) Date of Patent: Jan. 27, 2015

(54) AEROFOIL COMPRISING A HIGH LIFT FLAP

(75) Inventors: Bernhard Schlipf, Bremen (DE); Markus Gibbert, Bremen (DE); Daniel Schulze, Bremen (DE); Timo Danne, Bremen (DE)

(73) Assignee: Airbus Operations GmbH, Hamburg (DE)

( * ) Notice: Subject to any disclaimer, the term of this patent is extended or adjusted under 35 U.S.C. 154(b) by 278 days.

(21) Appl. No.: 13/255,245

(22) PCT Filed: Mar. 29, 2010

(86) PCT No.: PCT/EP2010/001983
§ 371 (c)(1),
(2), (4) Date: Feb. 22, 2012

(87) PCT Pub. No.: WO2010/108698
PCT Pub. Date: Sep. 30, 2010

(65) Prior Publication Data
US 2012/0138750 A1    Jun. 7, 2012

Related U.S. Application Data

(60) Provisional application No. 61/164,044, filed on Mar. 27, 2009.

(30) Foreign Application Priority Data

Mar. 27, 2009 (DE) .......................... 10 2009 015 397

(51) Int. Cl.
*B64C 3/50* (2006.01)
*B64C 9/22* (2006.01)

(52) U.S. Cl.
CPC ....................................... *B64C 9/22* (2013.01)
USPC ........................... 244/214; 244/215; 244/99.3

(58) Field of Classification Search
USPC ................................ 244/214, 215, 99.2, 99.3
See application file for complete search history.

(56) References Cited

U.S. PATENT DOCUMENTS 2,973,925 A * 3/1961 Wiele ............................ 244/203
4,285,482 A   8/1981 Lewis
(Continued)

FOREIGN PATENT DOCUMENTS

DE          103 28 717       12/2004
DE      10 2005 044 549       3/2007
(Continued)

OTHER PUBLICATIONS

Russian Office Action for Application No. 2011143224/11(064803) dated Dec. 18, 2012.
(Continued)

*Primary Examiner* — Isam Alsomiri
*Assistant Examiner* — Justin Benedik
(74) *Attorney, Agent, or Firm* — Jenkins, Wilson, Taylor & Hunt, P.A.

(57) ABSTRACT

An aerofoil wing with a main aerofoil, a high-lift flap movably arranged on the aerofoil wing by adjustment mechanisms. Each of the adjustment mechanisms including a first adjustment lever hinged to the main aerofoil via a first rotary linkage, with the formation of a first axis of rotation, a second adjustment lever hinged to the high-lift flap via a second rotary linkage, with the formation of a second axis of rotation, and a central linkage, with the formation of a third axis of rotation, such that the first, second and third axes of rotation pass through a common pole. The aerofoil wing further includes a drive device with a drive module mounted on the main aerofoil, and movable with respect to the drive module a drive lever coupled to the high-lift flap, and a stop device to limit the maximum extended setting of the high-lift flap.

14 Claims, 2 Drawing Sheets

(56) References Cited

U.S. PATENT DOCUMENTS

| | | | |
|---|---|---|---|
| 5,681,013 A * | 10/1997 | Rudolph | 244/214 |
| 7,063,292 B2 * | 6/2006 | Perez-Sanchez | 244/216 |
| 7,114,519 B2 | 10/2006 | Aitchison | |
| 7,484,694 B2 * | 2/2009 | Perez-Sanchez | 244/214 |
| 7,600,718 B2 * | 10/2009 | Perez-Sanchez | 244/215 |
| 7,861,978 B2 * | 1/2011 | Holert | 244/215 |
| 8,128,038 B2 | 3/2012 | Whitehouse et al. | |
| 8,302,913 B2 * | 11/2012 | Schlipf | 244/215 |
| 2005/0116114 A1 * | 6/2005 | Aitchison et al. | 244/207 |
| 2005/0116115 A1 * | 6/2005 | Perez-Sanchez | 244/212 |
| 2012/0138750 A1 | 6/2012 | Schlipf et al. | |

FOREIGN PATENT DOCUMENTS

| | | | |
|---|---|---|---|
| DE | 10 2009 015 397 | 9/2010 | |
| EP | 1 755 946 | 2/2007 | |
| EP | 1 764 303 | 3/2007 | |
| EP | 1764303 A2 * | 3/2007 | B64C 9/22 |
| GB | 2 402 914 | 12/2004 | |
| RU | 1816713 | 5/1993 | |
| RU | 2181332 | 4/2002 | |
| RU | 2397108 | 8/2010 | |
| WO | WO 2005/108205 | 11/2005 | |
| WO | WO 2010/108899 | 9/2010 | |

OTHER PUBLICATIONS

International Search Report for Application Serial No. WO 2010/108698 dated Jul. 6, 2010.

International Preliminary Report on Patentability and Written Opinion for Application Serial No. PCT/EP2010/001983 dated Oct. 6, 2011.

Chinese Office Action or Application No. 201080014161.6 dated Jul. 3, 2013.

Chinese Search Report for Application No. 201080014161.6 dated Jun. 24, 2013.

* cited by examiner

AEROFOIL COMPRISING A HIGH LIFT FLAP

RELATED APPLICATIONS

The present application is a national stage entry according to 35 U.S.C. §371 of PCT application No.: PCT/EP2010/001983 filed on 29 Mar. 2010, which claims priority from Germany Application No.: 102009015387.7, filed on 27 Mar. 2009, and from U.S. provisional Application No.: 61/164,044, filed on 27 Mar. 2009, the entire disclosures of which are incorporated herein by reference.

TECHNICAL FIELD

The invention concerns an aerofoil wing with a main aerofoil and a high-lift flap moveably arranged on the latter.

BACKGOUND

From DE 10 2005 044 549 B4 an aerofoil wing with a main aerofoil and a high-lift flap is of known art; the latter is movably arranged on the aerofoil wing by means of at least two adjustment mechanisms arranged side-by-side in the spanwise direction of the aerofoil wing, wherein each of the adjustment mechanisms is constituted from adjustment levers linked together, with the formation of three articulated axes, whose directions meet in a common pole.

SUMMARY

Embodiments of the invention provide an aerofoil wing with a main aerofoil and a high-lift flap moveably arranged on the latter, whose positioning device is kinematically optimised.

In accordance with the invention an aerofoil wing is provided with a main aerofoil and a high-lift flap, which is movably arranged by means of at least two adjustment mechanisms arranged side-by-side in the spanwise direction of the aerofoil wing. Here each of the adjustment mechanisms comprises:
  a first adjustment lever, which is hinged to the main aerofoil via a first rotary linkage, with the formation of a first axis of rotation,
  a second adjustment lever, which is hinged to the high-lift flap via a second rotary linkage, with the formation of a second axis of rotation,
  a central linkage, which links together the first and the second adjustment levers, with the formation of a third axis of rotation,
wherein the first, second and third axes of rotation pass through a common pole, which is fixed while the high-lift flap is positioned with reference to the location of the main aerofoil. In accordance with the invention the aerofoil wing has in particular a drive device with a drive module mounted on the main aerofoil, and movable with respect to the drive module a drive lever, which is coupled to the high-lift flap. Here provision is furthermore in particular made that the aerofoil wing has a stop device to limit the maximum extended setting of the high-lift flap.

In general the high-lift flap can be a leading-edge flap, and in particular a Krüger flap, which in its retracted position lies against the underside of the main aerofoil, or a slat, which can be moved between a retracted and an extended setting along a curved traverse path. Alternatively or additionally the high-lift flap can be designed as a trailing-edge flap.

Furthermore the drive device can be designed as a linear drive or a rotary drive.

The aerofoil wing in accordance with the invention can furthermore comprise a stop device to limit the maximum extended setting of the respective adjustment mechanism. In accordance with a first example of embodiment the stop device can be constituted with a stop lever acting between the first and the second adjustment lever, which is integrally constituted with the first adjustment lever, or with the second adjustment lever, and as an extension of the same in the direction towards the second axis or the first axis, and is configured such that the free end of the stop lever can be brought into a stop setting with a bearing device on the second adjustment lever, or on the first adjustment lever, so as to define the maximum extended setting of the respective adjustment mechanism.

Alternatively or additionally to this the stop device can be constituted with a stop lever to limit the maximum extended setting of the high-left flap, wherein the stop lever is integrally constituted with the first adjustment lever, or with a fitting of the main aerofoil, and as an extension of the same in the direction towards the fitting of the main aerofoil or the third linkage, and is configured such that the free end of the stop lever can be brought into a stop setting with the fitting of the main aerofoil, or the first adjustment lever, so as to define the maximum extended setting of the respective adjustment mechanism.

Alternatively or additionally to this the stop device can furthermore be constituted with a stop lever to limit the maximum extended setting of the high-left flap, wherein the stop lever is integrally constituted with the second adjustment lever, or with a fitting of the main aerofoil, and as an extension of the same in the direction towards the fitting of the main aerofoil, or the third linkage, and is configured such that the free end of the stop lever can be brought into a stop setting with the fitting of the main aerofoil, or the second adjustment lever, so as to define the maximum extended setting of the respective adjustment mechanism.

The stop device can in general be embodied such that this device limits a maximum extended setting of the leading-edge flap, whereby the directions of action of the adjustment lever have an angle of less than 180 degrees relative to one another.

Provision can also be made that a spring device acts together with the stop lever, which device in particular can be arranged between the stop lever and a lever. The spring device is arranged and embodied such that it exercises a restoring force onto the respective adjustment mechanism, i.e. onto the levers of the adjustment mechanism, by means of which the adjustment mechanism, i.e. the levers of the adjustment mechanism, are moved into their retracted position. The spring device can also be provided and embodied to exercise the function of cushioning the respective adjustment mechanism as it attains the maximum extended setting.

BRIEF DESCRIPTION OF THE DRAWINGS

In what follows examples of embodiment of the invention are described in terms of the accompanying figures, where.

DESCRIPTION

Figure 1:
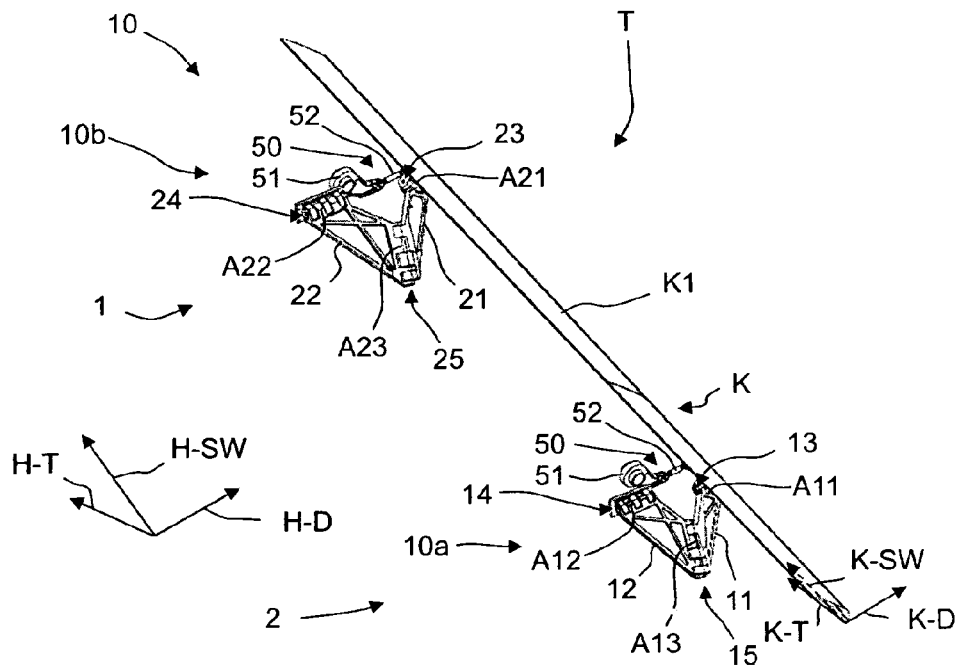
FIG. 1 shows a schematic perspective representation of a scrap section of an example of embodiment of a high-lift flap to be arranged on an aerofoil wing in accordance with the invention in the form of a leading-edge flap in an extended setting, which is arranged on the main aerofoil such that it can be moved by means of two adjustment mechanisms.

FIG. 1 represents in a schematic manner an example of embodiment of the aerofoil wing T in accordance with the invention with a main aerofoil of a high-lift flap K. The high-lift flap K is arranged on the main aerofoil by means of a positioning device 10 with at least two adjustment mechanisms 10a, 10b, which are arranged side-by-side in the spanwise direction H-SW of the main aerofoil, or in the spanwise direction K-SW of the high-lift flap K. In accordance with the invention the high-lift flap K can be a leading-edge flap K1 or a trailing-edge flap.

In FIG. 1 the high-lift flap K is a leading-edge flap K1, which is designed as a slat. In accordance with the invention the leading-edge flap K1 can also be a Krüger flap, which in its retracted position lies against the underside H1 of the main aerofoil. In FIG. 1 the leading-edge flap K1 is represented in an extended setting. In FIG. 1 two adjustment mechanisms 10a, 10b are represented on the scrap section represented of the main aerofoil and the leading-edge flap K1 to illustrate the functional principle of the invention. Also incorporated in FIG. 1 is a coordinate system for the main aerofoil with the main aerofoil spanwise direction H-SW, the main aerofoil chordwise direction H-T and the main aerofoil thickness direction H-D as coordinate axes, and also a coordinate system for the high-lift flap K with the high-lift flap spanwise direction K-SW, the high-lift flap chordwise direction K-T and the high-lift flap thickness direction K-D as coordinate axes.

The high-lift flap, i.e. leading-edge flap, is arranged such that it can be moved by means of at least two adjustment mechanisms on the main aerofoil between a retracted and an extended setting. In FIG. 1 the leading-edge flap represented is shown in an extended setting, wherein the extended setting represented is not the maximum extended setting of the high-lift flap K, i.e. of the leading-edge flap K1.

As can be seen from FIG. 1, the adjustment mechanism 10a of the positioning device 10 has:
 a first adjustment lever 11, which is hinged to the main aerofoil via a first rotary linkage 13, with the formation of a first rotary axis A11, wherein the rotary axis A11 of the first rotary linkage 13 runs transversely, or at an angle, to the main aerofoil spanwise direction H-SW and the main aerofoil chordwise direction H-T,
 a second adjustment lever 12, which is hinged to the high-lift flap K, i.e. the leading-edge flap K1, via a second rotary linkage 14, with the formation of a second rotary axis A12, wherein the rotary axis A12 of the second rotary linkage 14 runs transversely, or at an angle, to the high-lift flap spanwise direction K-SW and the high-lift flap thickness direction K-D,
 a central linkage 15, which links together the first 11 and the second 12 adjustment levers, with the formation of a third axis of rotation A 13.

In accordance with the invention the directions of the first, second and third rotary axes A11, A12 and A13 respectively of the first adjustment mechanism 10a meet at a common pole P, which is fixed, i.e. is independent of the high-lift flap K, i.e. of the leading-edge flap K1, while the high-lift flap K is positioned relative to the location of the main aerofoil. By this means the high-lift flap K executes a movement with a circular arc-shaped path relative to the main aerofoil, when the former is moved from its retracted setting into the extended setting, and vice versa.

As can furthermore be seen from FIG. 1, the second adjustment mechanism 10b of the positioning device 10 has:
 a first adjustment lever 21, which is hinged to the main aerofoil via a first rotary linkage 23, with the formation of a first rotary axis A21, wherein the rotary axis A21 of the first rotary linkage 23 runs transversely, or at an angle, to the main aerofoil spanwise direction H-SW and the main aerofoil chordwise direction H-T,
 a second adjustment lever 22, which is hinged to the high-lift flap K, i.e. the leading-edge flap K1, via a second rotary linkage 24, with the formation of a second rotary axis A22, wherein the rotary axis A22 of the second rotary linkage 24 runs transversely, or at an angle, to the high-lift flap spanwise direction K-SW and the high-lift flap thickness direction K-D,
 a central linkage 25, which links together the first 21 and the second 22 adjustment levers, with the formation of a third axis of rotation A23.

In accordance with the invention the directions of the first, second and third rotary axes A21, A22 and A23 respectively of the second adjustment mechanism 10b meet at a common pole P, which is fixed, i.e. is independent of the high-lift flap K, i.e. of the leading-edge flap K1, while the high-lift flap K is positioned relative to the location of the main aerofoil.

Figure 2:
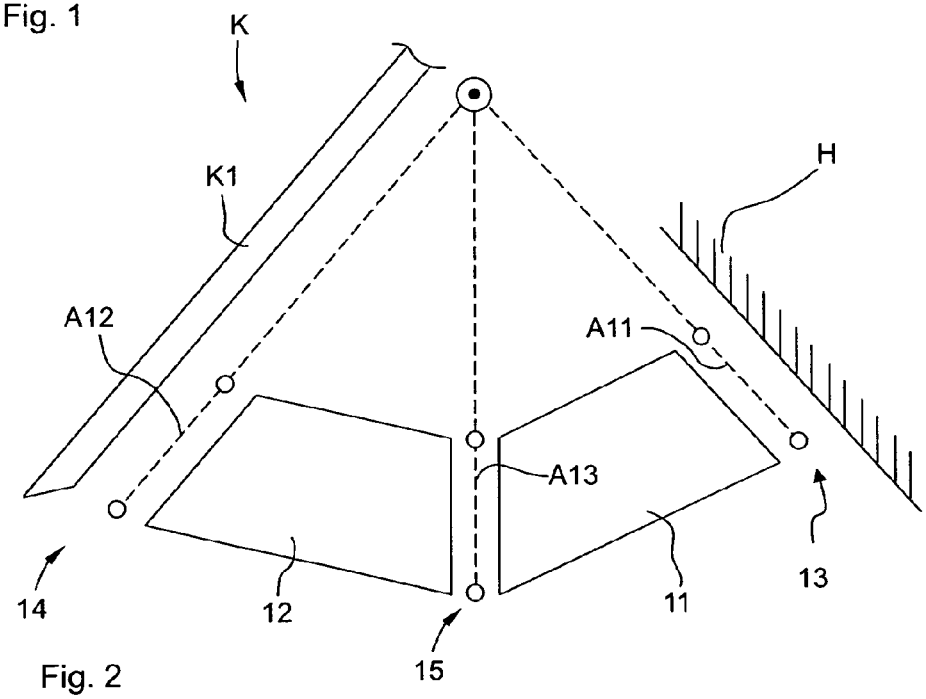
FIG. 2 shows a representation of a plan view of one of the adjustment mechanisms in an extended setting, which schematically shows the kinematics of the adjustment mechanism.

In FIG. 2 the first adjustment mechanism 10a is schematically illustrated in an exemplary manner to illustrate the kinematic concept.

In accordance with the invention provision is made that,
 the aerofoil wing T has a drive device 50 with a drive module 51 mounted on the main aerofoil, and movable with respect to the drive module a drive lever 52, which is coupled to the high-lift flap K, and
 the aerofoil wing T has a stop device 60 to limit the maximum extended setting of the high-lift flap K, i.e. of the leading-edge flap K1.

By means of the features in accordance with the invention there takes place a kinematic decoupling of the drive from the constraining forces occurring in the adjustment mechanisms and the high-lift flap K; these forces arise as a result of positioning forces, and also as a result of the bending of the high-lift flap caused by the aerodynamic forces occurring in flight.

The drive device 50 can be constituted from a linear drive or a rotary drive.

Figure 3:
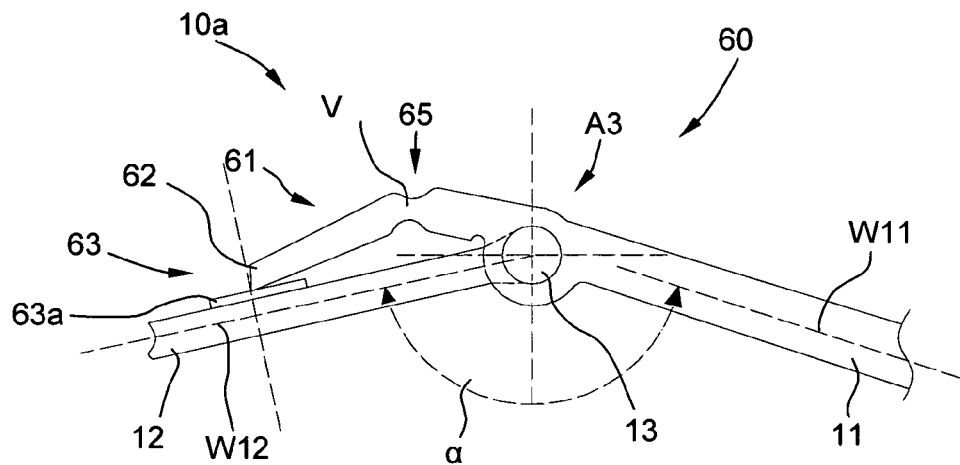
FIG. 3 shows a cross-sectional representation of an example of embodiment of a stop device to limit the maximum extended setting of the leading-edge flap.
Figure 4:
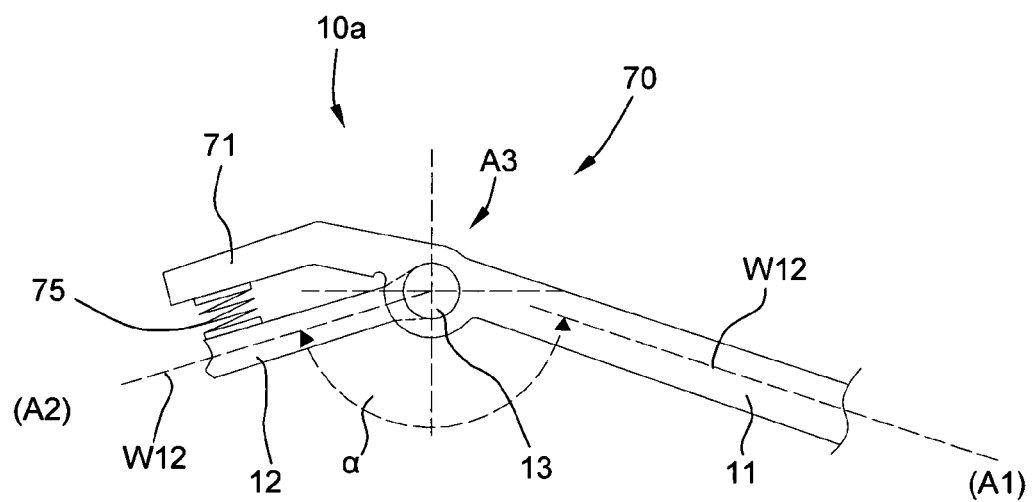
FIG. 4 shows a cross-sectional representation of a further example of embodiment of a stop device to limit the maximum extended setting of the leading-edge flap.

The stop device can be designed in various ways, and in particular with a stop lever. The stop device can be provided on only one adjustment mechanism, on a plurality of adjustment mechanisms, or on all adjustment mechanisms of a positioning device 10. FIGS. 3 and 4 represent in each case an example of embodiment of the stop device in accordance with the invention, wherein these examples of embodiment of the stop device represented act between the first 11 and the second 12 adjustment levers, so that the lines of action of the same, W11 or W12 respectively, run at an angle alpha relative to one another in the maximum extended setting, which defines the stop device. In this case the line of action of the first adjustment lever or the second adjustment lever 12, 22 is to be understood as the connecting line between the first axis A11, A21 and the third axis A13, A23, or between the third axis A12, A22 and the second axis A12, A22, respectively.

FIG. 3 shows a cross-sectional representation of an example of embodiment of a stop device 60 in terms of the first adjustment mechanism 10a, wherein the features of this example of embodiment can be provided alternatively or additionally on the second adjustment mechanism 10b. In the example of embodiment represented the stop lever is provided on the adjustment mechanism such that this acts between the first adjustment lever 11 and the second adjustment lever 12. For this purpose in the example of embodiment represented a stop fever 16 is arranged on the first adjustment lever 11.

The stop lever 61 is integrally constituted with the first adjustment lever 11 and as an extension of the same in the direction towards the second axis A2. The free end 62 of the stop lever 61 is provided to lie against the upper face 12a of the second adjustment lever 12 when the extended setting of the high-lift flap K is a maximum, i.e. when the high-lift flap K is located in its maximum extended setting. A bearing device, in particular in the form of a bearing plate 63, can be provided as an opposing surface on the second adjustment lever 12, against which the stop lever 61 lies, when the adjustment mechanism 10a is located in the maximum extended setting.

Alternatively or additionally to this form of embodiment a stop lever 16 can also be arranged on the second adjustment lever 12. Here the features ensue in an analogous manner to the previously described example of embodiment in which the stop lever is arranged on the first adjustment lever 11.

Alternatively or additionally to this the stop device 60, 70 can be embodied with a stop lever 61, 71 to limit the maximum extended setting of the high-lift flap K such that this acts between the high-lift flap K and the second adjustment lever 12, 22, and/or between the main aerofoil and the first adjustment lever 11, 21.

In the first alternative cited the stop lever 61, 71 is integrally constituted with the second adjustment lever 12, 22, or with a fitting of the high-lift flap K, and as an extension of the same in the direction towards the fitting of the high-lift flap K, or towards the third linkage 13, 23, and is configured such that the free end 62, 72 of the stop lever 61, 71 can be brought into a stop setting with the fitting of the high-lift flap K, or the second adjustment lever 12, 22, so as to define the maximum extended setting of the respective adjustment mechanism 10a, 10b.

In the second alternative cited the stop lever 61, 71 is integrally constituted with the respective first adjustment lever 11, 21, or with a fitting of the main aerofoil and as an extension of the same in the direction towards the fitting of the main aerofoil, or towards the third linkage 13, 23, and is configured such that the free end 62, 72 of the stop lever 61, 71 can be brought into a stop setting with the fitting of the main aerofoil or the first adjustment lever 11, 21, so as to define the maximum extended setting of the respective adjustment mechanism 10a, 10b.

In accordance with the invention the stop device can be configured such that the stop device 60, 70 limits a maximum extended setting of the leading-edge flap, whereby the directions of action W11, W12 of the adjustment lever have an angle (alpha, α) of less than 180 degrees, and e.g. a maximum of 179 degrees, relative to one another.

In general the stop lever 61 can be provided with a spring device 65, which in particular can be designed as a tapering of the cross-section of the stop lever 61. In the example of embodiment in accordance with FIG. 3 it is thereby achieved that in the phase in which the positioning device 10 attains its maximum extended setting, e.g. in that the free end of the stop lever 61 makes contact with the second adjustment lever or the bearing plate 63 of the same, the stop moments and forces that thereby arise are accommodated by the stop lever 61 in a sprung manner. By this means the stop of the adjustment lever 11, 12 when attaining the maximum extended setting of the positioning device or the respective adjustment mechanism is provided with a sprung accommodation path and the stop forces are minimised. In this manner the maximum forces occurring as the stop attains the maximum extended setting can be reduced and the dimensions of the structure can be optimised.

Alternatively or additionally the spring device can also be constituted by means of a spring device 75 (FIG. 4) acting between the first adjustment lever or the second adjustment lever, as provided in the example of embodiment represented in FIG. 4. If the stop device 60, 70 to limit the maximum extended setting of the high-lift flap K is to be embodied such that this acts between the high-lift flap K and the second adjustment lever 12, 22, and/or between the main aerofoil and the first adjustment lever 11, 21, a spring device in accordance with FIG. 4 can also be arranged in an analogous manner on the main aerofoil 10, or on the high-lift flap K.

The spring device is arranged and embodied such that this exerts a restoring force onto the respective adjustment mechanism, i.e. onto the lever of the adjustment mechanism, by means of which the adjustment mechanism, i.e. the lever of the adjustment mechanism, is moved into its retracted position. The spring device can also be provided and embodied to exercise the function of cushioning the respective adjustment mechanism as it attains the maximum extended setting.

While the invention has been particular shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

The invention claimed is:

1. An aerofoil wing comprising a main aerofoil and a high-lift flap, which is movably arranged on the aerofoil wing by at least two adjustment mechanisms arranged side-by-side in a spanwise direction of the aerofoil wing, each of the adjustment mechanisms having:
    a first adjustment lever, which is hinged to the main aerofoil via a first rotary linkage, forming a first axis of rotation,
    a second adjustment lever, which is hinged to the high-lift flap via a second rotary linkage, forming a second axis of rotation, and
    a central linkage, which links together the first and the second adjustment levers, forming a third axis of rotation,
    wherein the aerofoil wing has a drive device with a drive module mounted on the main aerofoil and movable with respect to the drive module a drive lever, which is coupled to the high-lift flap to exert force between the main aerofoil and the high-lift flap in a manner bypassing the adjustment mechanism,
    the aerofoil wing having a stop device to limit a maximum extended setting of the high-lift flap.

2. The aerofoil wing in accordance with claim 1, wherein the high-lift flap is a leading-edge flap.

3. The aerofoil wing in accordance with claim 2, wherein the leading-edge flap is a Krüger flap, which in its retracted position lies against the underside of the main aerofoil.

4. The aerofoil wing in accordance with claim 3, wherein the leading-edge flap is a slat.

5. The aerofoil wing in accordance with claim 1, wherein the high-lift flap is a trailing-edge flap.

6. The aerofoil wing in accordance with claim 1, wherein the drive device comprises a linear drive.

7. The aerofoil wing in accordance with claim 1, wherein the drive device comprises a rotary drive.

8. The aerofoil wing in accordance with claim 1, wherein the stop device comprises a stop lever acting between the first and the second adjustment lever, which is integrally constituted with the first adjustment lever, or with the second adjustment lever, and as an extension of the same in a direction towards the second axis, or the first axis, and is configured such that a free end of the stop lever can be brought into a stop setting with a bearing device on the second adjustment lever, or on the first adjustment lever so as to define a maximum extended setting of the respective adjustment mechanism.

9. The aerofoil wing in accordance with claim 1, wherein the stop device comprises a stop lever to limit the maximum extended setting of the high-lift flap, which is integrally constituted with the first adjustment lever, or with a fitting of the main aerofoil, and as an extension of the same in a direction towards the fitting of the main aerofoil, or towards the third linkage, and is configured such that a free end of the stop lever can be brought into a stop setting with the fitting on the main aerofoil, or the first adjustment lever so as to define a maximum extended setting of the respective adjustment mechanism.

10. The aerofoil wing in accordance with claim 1, wherein the stop device comprises a stop lever to limit the maximum extended setting of the high-lift flap, which is integrally constituted with the second adjustment lever, or with a fitting of the high-lift flap, and as an extension of the same in a direction towards the fitting of the high-lift flap, or towards the third linkage, and is configured such that a free end of the stop lever can be brought into a stop setting with the fitting on the high-lift flap or the second adjustment lever so as to define a maximum extended setting of the respective adjustment mechanism.

11. The aerofoil wing in accordance with claim 2, wherein the stop device is configured such that with the latter a maximum extended setting of the leading-edge flap is limited, whereby directions of action of the adjustment lever have an angle of less than 180 degrees relative to one another.

12. The aerofoil wing in accordance with claim 8, wherein a spring device acts together with the stop lever so as to cushion the respective adjustment mechanism as it attains the maximum extended setting.

13. The aerofoil wing in accordance with claim 9, wherein a spring device acts together with the stop lever so as to cushion the respective adjustment mechanism as it attains the maximum extended setting.

14. The aerofoil wing in accordance with claim 10, wherein a spring device acts together with the stop lever so as to cushion the respective adjustment mechanism as it attains the maximum extended setting.

* * * * *